United States Patent
Todasco et al.

(10) Patent No.: US 11,508,105 B2
(45) Date of Patent: Nov. 22, 2022

(54) USING AUGMENTED REALITY FOR ACCESSING LEGACY TRANSACTION TERMINALS

(71) Applicant: PAYPAL, INC., San Jose, CA (US)

(72) Inventors: Michael Charles Todasco, San Jose, CA (US); Braden Christopher Ericson, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 17/222,916

(22) Filed: Apr. 5, 2021

(65) Prior Publication Data

US 2021/0248797 A1  Aug. 12, 2021

Related U.S. Application Data

(63) Continuation of application No. 15/799,358, filed on Oct. 31, 2017, now Pat. No. 10,970,897.

(51) Int. Cl.
| | |
|---|---|
| *G06T 11/60* | (2006.01) |
| *G06F 3/04886* | (2022.01) |
| *G06Q 20/32* | (2012.01) |
| *G06F 3/01* | (2006.01) |
| *G06Q 20/20* | (2012.01) |
| *G06V 20/20* | (2022.01) |
| *G06F 3/023* | (2006.01) |
| *H04W 4/80* | (2018.01) |

(52) U.S. Cl.
CPC .............. *G06T 11/60* (2013.01); *G06F 3/011* (2013.01); *G06F 3/023* (2013.01); *G06F 3/04886* (2013.01); *G06Q 20/20* (2013.01); *G06Q 20/204* (2013.01); *G06Q 20/322* (2013.01); *G06Q 20/3274* (2013.01); *G06V 20/20* (2022.01); *G06T 2200/24* (2013.01); *H04W 4/80* (2018.02)

(58) Field of Classification Search
CPC ...... G06T 11/60; G06T 2200/24; G06F 3/011; G06F 3/023; G06F 3/04886; G06K 9/00671; G06Q 20/20; G06Q 20/204; G06Q 20/206; G06Q 20/322; G06Q 20/3274; H04W 4/80; G07F 9/001
See application file for complete search history.

(56) References Cited

U.S. PATENT DOCUMENTS

| | | | |
|---|---|---|---|
| 8,145,913 B1 | 3/2012 | Zaitsev | |
| 2014/0263618 A1 | 9/2014 | McCarthy et al. | |
| 2015/0073907 A1* | 3/2015 | Purves | G06Q 20/32 705/14.58 |
| 2016/0307001 A1* | 10/2016 | Dow | G06F 3/0304 |
| 2018/0158053 A1* | 6/2018 | Adams | G06F 3/011 |

* cited by examiner

*Primary Examiner* — Cao H Nguyen
(74) *Attorney, Agent, or Firm* — Haynes and Boone, LLP

(57) ABSTRACT

A method for accessing legacy devices via Augmented Reality (AR) devices. The method includes acquiring, via an AR device, an image of a keyboard of a legacy device. The method includes accessing customer commands for initiating of a transaction using the legacy device. The method includes determining a command sequence based, at least in part, on the customer commands, the command sequence mapping to a keystroke sequence to be entered using the keyboard. The method includes generating an overlay indicating a keystroke sequence corresponding to the command sequence. The method also includes displaying, via the AR device, the overlay by visually projecting the overlay over the keyboard of the legacy device.

20 Claims, 6 Drawing Sheets

USING AUGMENTED REALITY FOR ACCESSING LEGACY TRANSACTION TERMINALS

CROSS REFERENCE TO RELATED APPLICATION

The present application claim priority to and is a continuation of U.S. patent application Ser. No. 15/799,358 filed Oct. 31, 2017, all of which is incorporated by reference in its entirety.

BACKGROUND

Embodiments of the inventive subject matter generally relate to the field of augmented reality and, more particularly, to using augmented reality to access legacy transaction terminals.

Augmented Reality (AR) is a computer-generated environment that augments user's view of a real-world environment using computer-generated elements, such as sound, video, and/or other sensory outputs. AR can be implemented using computer-generated images that overlay a user-accessed view of a real-world. AR images can be displayed via AR glasses that are worn by the user, and thus can augment the real-world view seen by the user. For example, AR can be used to display supplemental images about certain elements in a field of vision of the AR glasses. The supplemental images are displayed in a way that aligns with real-world elements seen by the user.

A computer system that implements AR can access images of the real-world in the field of vision of the AR glasses. The computer system can then perform image analysis to detect certain elements in the accessed image. Based on element detection, the computer system can determine AR images to superimpose over the accessed image. The AR images can be moved and/or resized as the user moves the AR glasses and/or when the detected elements move, which can be caused by the user walking, user's head movement, movement of the detected elements, and/or via other movements. The user may also access a legacy transaction terminal, such as a legacy point-of-sale terminal. Such legacy transaction terminals typically are difficult to use for a novice user. The user may not obtain any benefit of using AR devices when accessing such a legacy transaction terminal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
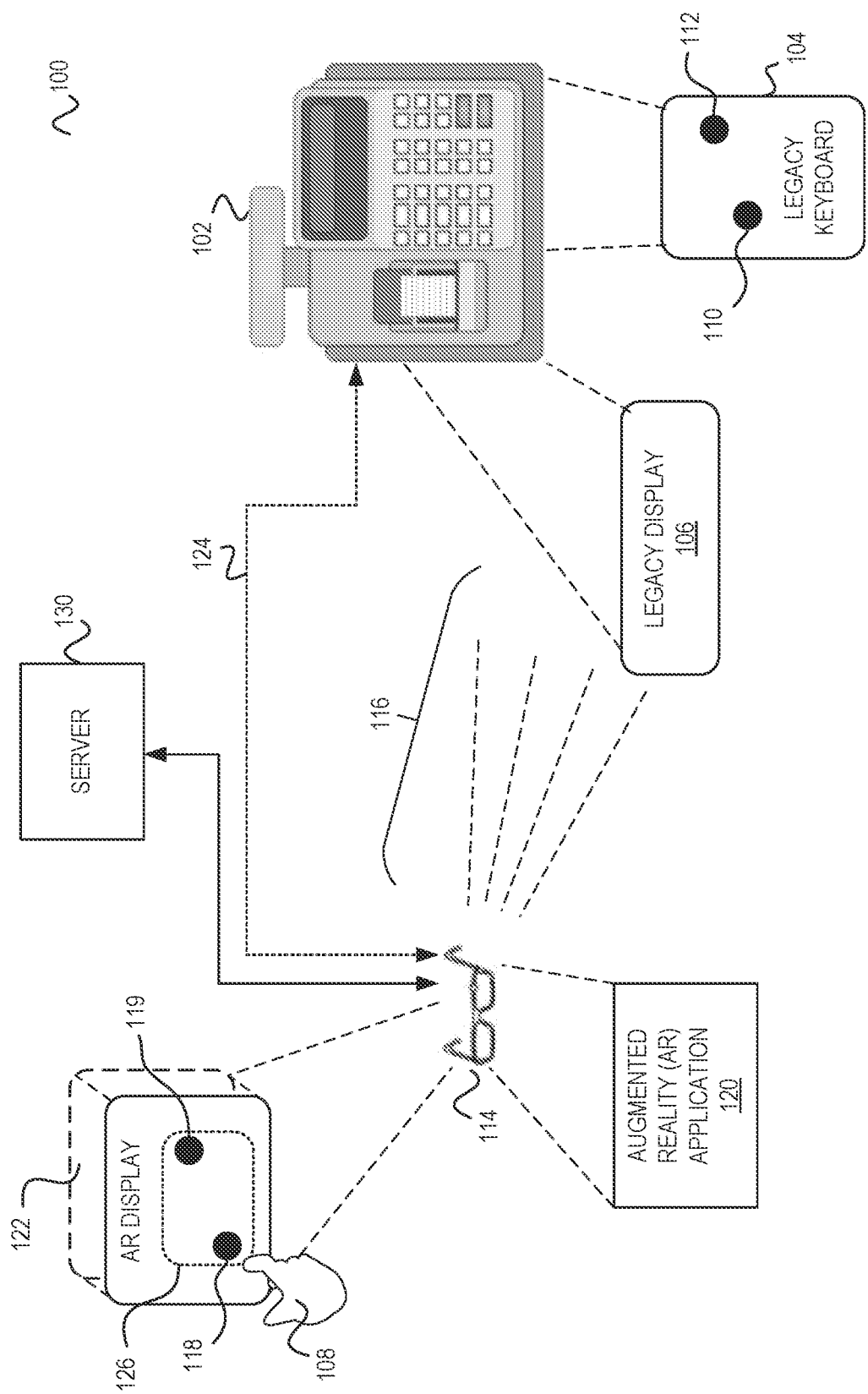
FIG. 1 is a system diagram illustrating embodiments of a system that uses an AR device to access legacy transaction terminals.

The description that follows includes exemplary systems, methods, techniques, instruction sequences and computer program products that embody techniques of the present inventive subject matter. However, it is understood that the described embodiments may be practiced without these specific details. For instance, although many examples refer to AR, computer-generated images that simulate a user's physical presence in an imaginary environment can be used instead, such as Virtual Reality (VR). In some embodiments, AR and VR can be used interchangeably. In some embodiments, AR and VR can be used at the same time. In some embodiments, mixed reality (MR) can be used instead, where virtual and real worlds are combined. In MR, immersive environments are created that allow a user to interact with real world environments (such as via user-controlled robots) via real and virtual elements.

The AR device can determine objects and/or images at which the user is looking. The AR device can use eye-tracking, or another technique, to determine a field-of-view that is viewed by the user of the AR device (also referred to as a "user view") of a real-world. For example, the AR device can have a camera (and/or other optical sensors) that can take videos and/or multiple photos, referred to collectively as image acquisition. The AR device can analyze the acquired images, such as by applying image analysis, to determine content of these images. For example, the AR device (or another device in communication with the AR device) can perform image analysis to detect certain elements in the viewed image(s). The AR device can also determine images and/or elements in these images that are most often viewed by the user. The AR device can also include one or more microphones for acquiring audio, or receive audio data from another device.

The AR device can be used to facilitate easy and efficient operator access with legacy devices. The AR device can acquire an image of a keyboard of a legacy device. For example, the AR device can acquire the image, from the user view, of the legacy device that is accessed by the user. The AR device can access customer commands for initiating of a transaction using the legacy device. For example, the AR device can access and analyze audio data to determine the customer commands. The AR device can determine a command sequence based, at least in part, on the customer commands. The command sequence can map to a keystroke sequence, which can be entered using the keyboard. The AR device can generate an overlay indicating a keystroke sequence that maps to the command sequence. The AR device can display, via an AR display, the overlay by visually projecting, in the user view, the overlay over the keyboard of the legacy device.

Therefore, the methods described herein allow the operator to use his or her AR device to access and use a legacy device, such as to quickly initiate processing of a transaction. The AR device can, based on audio data (such as customer data) acquired from a customer, determine a requested transaction. The AR device can then display an overlay over the keyboard of the legacy device for guiding the user how to access the keyboard of the legacy device.

The following description, and associated Figures, illustrates various embodiments directed to the ideas listed above.

FIG. 1 is a system diagram illustrating embodiments of a system that uses an AR device for securely processing transactions that are initiated at another device. In an overview of a system diagram 100, a legacy device 102 includes a legacy display 106 and a legacy keyboard. An operator can use the legacy device 102 to initiate a transaction. The transaction can be for a purchase of a product and/or a service. The transaction can be composed of more elements, which need to be performed sequentially or in parallel.

The legacy device 102 can be a point-of-sale (PoS), a simple cash register, or another device that can be accessed by an operator for initiating and processing of a transaction. The legacy device 102 can include a legacy keyboard 104 having a plurality of physical keys, including physical keys 110 and 112. The operator can access the legacy device 102 via the legacy keyboard 104 to enter a keystroke sequence using the legacy keyboard 104 (e.g., by selecting the physical keys 110 and 112). The keystroke sequence can be entered by the operator, via the legacy keyboard 104 to perform operations corresponding to elements of the transaction. The legacy device 102 can display results of entering of the transaction elements via the legacy display 106. However, the operator can have difficulty with accurately selecting keys of the legacy keyboard 104 required to initiate each transaction.

The AR device 114 can provide easy access to the legacy device 102 for initiating of the transaction. The AR device 114 can process customer commands, and display, via an AR display 122, an overlay 126 that visually projects over the legacy keyboard 104. The overlay 126 can indicate what keys, and key selection order, of the legacy keyboard 104 to select for initiating of the transaction. Thus, the operator can, by accessing the keys of the legacy keyboard 104 via key indicators displayed by the overlay 126, easily operate the legacy device 102. In some implementations, the legacy keyboard 104 can be implemented using other input/output devices, such as a virtual keyboard that is displayed via the legacy display 106. In this embodiment, the AR device 114 would display the overlay 126 over the virtual keyboard.

The AR device 114 can be a device operable to generate an AR environment by augmenting a user's view of a real-world environment using computer-generated elements, such as by using sound, video, and/or other sensory outputs. The AR device 114 can be implemented using AR glasses or another device that generates images (or accesses generated images) and overlays a user-accessed view of a real-world. AR images can be displayed on an AR display 122 of the AR device 114. For example, the AR images can be displayed via AR glasses that are worn by the user (e.g., the operator of the legacy device 102), and thus can augment a real-world view seen by the user. The AR display 122 can overlay AR elements on the user view via the overlay 126. The AR elements can be visual elements generated by the AR device 114, or that are received from another device or server.

The AR device 114 can host an AR application 120 that acquires and/or processes various data, and based on the data processing, determines the AR elements to display on the AR display 122. The AR application 120 can be any type of an application that can access and analyze audio and video data that is acquired, for example, via the AR device 114. The AR application 120 can be a stand-alone application, or provide client functionality as accessed via a web browser. The AR device 114 can acquire an image of the legacy device 102, such as of the legacy keyboard 104. The AR application 120 can perform image analysis on the acquired images to determine whether the images include representations of certain elements. For example, the AR application 120 can determine a type of the legacy device 102 based on the image analysis of images of the legacy keyboard 104 and/or images of the entire legacy device 102.

The AR application 120 can communicate with a server 130 to determine the type of the legacy device 102. The communication can include certain characteristics of the legacy device 102, as determined by the AR application from the image analysis. The communication can include one or more of the acquired images (entire images or portions) of the legacy device 102. The server 130 can include a database of legacy devices, and determine, based on communication from the AR application 120, the legacy device type. The server 130 can then communicate the legacy device type to the AR application 120.

The AR application 120 can acquire audio data, which can be provided by a customer of the operator of the legacy device 102. The customer can be located in a close physical proximity of the operator (and thus of the AR device 114 worn by the operator). The AR application 120 can access an audio file with audio provided by the customer. The AR application 120 can analyze the audio data to determine whether the audio data includes customer commands for initiating of a transaction using the legacy device 102. The AR application 120 can analyze the customer commands to determine a command sequence that corresponds to elements of the transaction. The AR application 120 can analyze the command sequence to determine a keystroke sequence to be selected, by the operator, using the legacy keyboard 104 to initiate the transaction.

The AR application 120 can generate an overlay 126 indicating the keystroke sequence. The AR application 120 can display, via the AR display 122, the overlay 126 by visually projecting the overlay 126 over the legacy keyboard 104. In some embodiments, the overlay 126 can substantially line up, in the user view, with the legacy keyboard 104, such that key indicators 118 and 119 visually line up with the corresponding physical keys 110 and 112, respectively. In some embodiments, the AR application 120 can also determine a keystroke sequence order that indicates an order in which the physical keys of the legacy keyboard should be selected by the operator. The overlay 126 can visually indicate the order in which the physical keys should be accessed, such as by first projecting the key indicator 118 over the physical key 110, without projecting the key indicator 119 over the physical key 112. Once the AR application 120 detects a user selection of the key 110, the AR application 120 can cease displaying the key indicator 118 over the physical key 110, and instead display the key indicator 119 over the physical key 112.

In some embodiments, AR application 120 can receive a user selection 108 by tracking user gestures. For example, the AR device 114 can use cameras to track location and movement of user's arm, hand, and/or fingers to determine whether the operator selects a physical key that is indicated by one of the key indicators 118 or 119. If the overlay 126 is properly aligned with the legacy keyboard 104, the user selection 108 of the key indicator 118 also selects the physical key 110 (that is mapped to the key indicator 118). The AR device 114 can determine the user selection 108 based on user's gestures as determined by the cameras. In some embodiments, the AR device 114 can use motion detection sensors such as infrared sensors and/or photodetectors to detect hand motions and/or gestures. The AR device 114 can track the movement of user's hand via tracking gloves worn by the user, where the tracking gloves can include sensors that detect user's hand and/or finger movements. In some embodiments, the AR device 114 can determine the user selection 108 based on position and/or signals received from a pointing device held by the operator.

In some embodiments, the AR application 120 can generate a shortcut key (as discussed below with reference to FIG. 4). For example, the AR application 120 can use the key indicator 119 as the shortcut key instead of the key indicator 119 being mapped to the physical key 112. The AR application 120 can determine to place a location of the key indicator 119 on the overlay 126 so it maps to another physical key of the legacy keyboard 104. The AR application 120 can determine to place the location of the key indicator 119 on the AR display 122 such that it does not map to any physical keys of the legacy keyboard, and is only accessible via the AR display 122, i.e., as a virtual key. Upon detection of selection of the virtual key by the user selection 108, the AR device 114 can provide haptic feedback to the user to indicate that the user selection 108 has been received.

The AR device 114 can communicate at least a portion of the command sequence to the legacy device 102 via a legacy communication link 124. The legacy communication link 124 can be implemented using a serial RS-232 interface, a general purpose interface (GPIB or HPIB), a parallel port interface, or any one of legacy serial or parallel interfaces for enabling communication (e.g., data transfer) between devices such as an IEEE 1394, parallel SCSI, mini-DIN, among others. The legacy communication link 124 can be implemented using legacy wireless communication technology such as RF data links or UHF or VHF data links. In some implementations, the legacy communication link 124 can be implemented using a newer communication interface such as Universal Serial Bus (USB).

Figure 2:
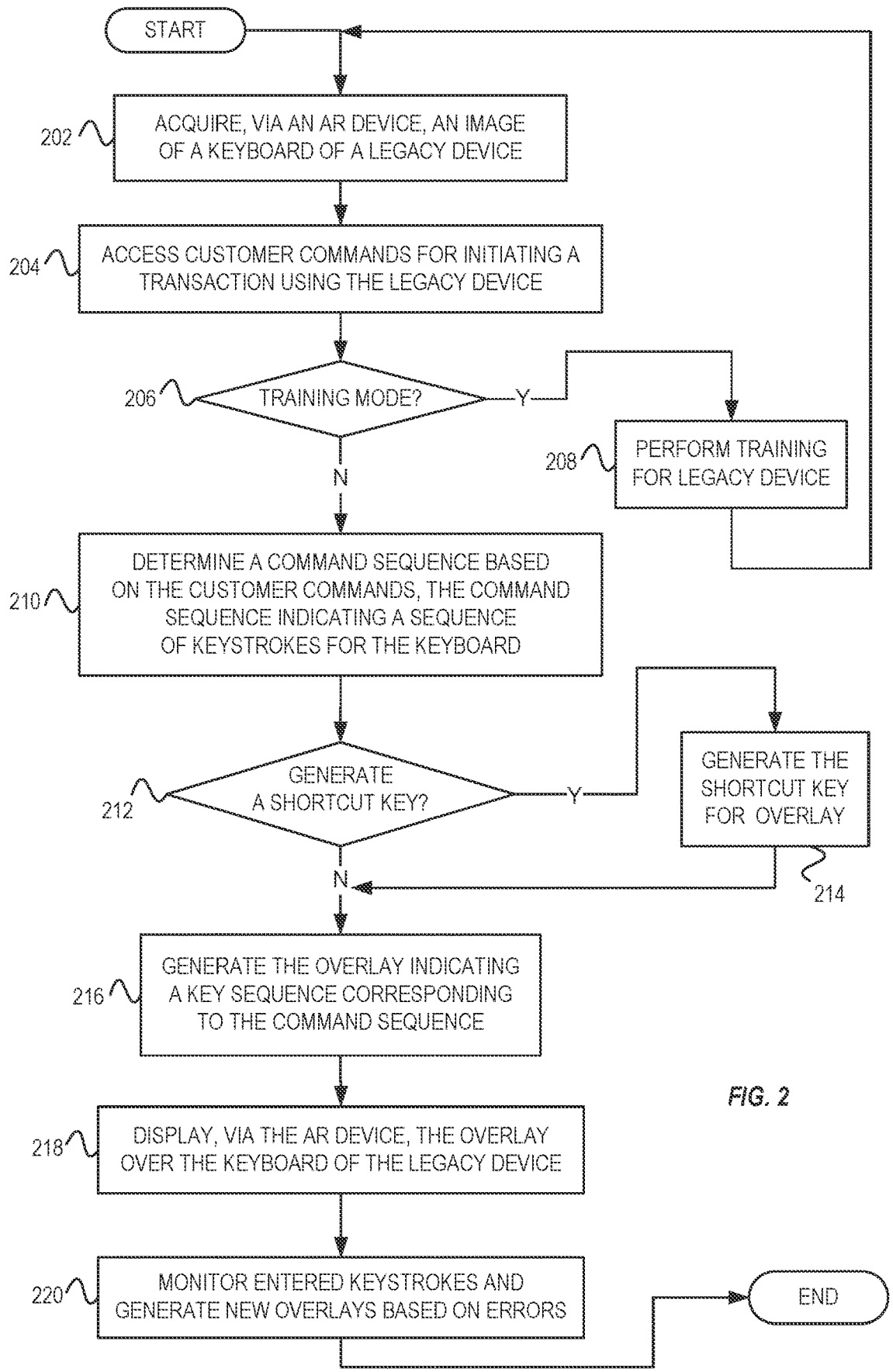
FIG. 2 is a flow diagram illustrating embodiments of operations for using an AR device to access legacy transaction terminals.

FIG. 2 is a flow diagram illustrating embodiments of operations for using an AR device to access legacy transaction terminals. The method of FIG. 2 is described with reference to the systems and components described in FIG. 1 (for illustration purposes and not as a limitation). The example operations can be carried out by the AR application 120.

Beginning with 202, the AR application acquires an image of a keyboard of a legacy device. With reference to FIG. 1, the AR application 120 can acquire an image of the legacy keyboard 104 that is being used by the operator. The AR application 120 can determine, based on image analysis of the image, a device type of the legacy device 102. The AR application 120 can access, based on the device type, a keyboard layout of the keyboard from a database of keyboard layouts. In some embodiments, the AR application 120 can locally (i.e., local to the AR device 114) determine the device type. The AR application 120 may also locally determine the keyboard layout based on the device type, or communicate the device type to the server 130 for determination of the keyboard layout. In some embodiments, the AR application 120 can communicate the image or the results of the image analysis to the server 130 for determination of the device type. The server 130 would then communicate the device type and the keyboard layout to the AR device 114.

At 204, the AR application accesses customer commands for initiating a transaction using the legacy device. With reference to FIG. 1, the AR application 120 can acquire and access (or access previously acquired) audio data, which can be received from a customer that is interfacing with the operator of the legacy device 102. The AR application 120 can perform voice analysis on the audio data to determine customer commands. The AR application 120 can perform the voice analysis locally, or can communicate with the server 130 for sending the audio data and receiving results (i.e., customer commands) of the voice analysis. It is noted that the customer commands can be generated based other means of communication beside voice. For example, the AR application 120 can acquire, via the camera(s), a video of sign language provided by the customer. The AR application 120 can determine the customer commands based on analysis of the sign language video. In some embodiments, the AR application 120 can use the camera(s) to acquire visual cues from body movements, gestures, and other non-verbal communication from the customer. The AR application 120 can also use the customer visual cues when determining the customer commands.

At 206, the AR application determines whether the AR device is in a training mode. With reference to FIG. 1, the AR application 120 can determine that the AR device 114 is being used to train based on the legacy device 102. The training mode can also be for training elements (e.g., transaction rules and/or databases) of the server 130. If the AR application determines that the AR device is in the training mode, flow continues at 208. Otherwise, flow continues at 210.

At 208, the AR application performs training for the legacy device. The AR application 120 can thus be placed in a training mode, where the AR application 120 acquires and analyzes images, or transmits the images to the server 130, of the operator selecting various keystrokes along with associated customer commands (such as received at 204). In some embodiments, the AR application 120 can acquire, via the AR device 114, a set of images corresponding to a training set of keystrokes for the transaction using the legacy device 102. In some embodiments, the AR application 120 can locally correlate the training set of keystrokes to the set of customer commands to generate a set of command sequences. Using the set of command sequences and the training set of transactions, the AR application 120 can generate a set of transaction rules for the legacy device (and optionally for a type of a merchant for which the transaction is initiated). In some embodiments, the AR application 120 can transmit the image and audio data to the server 130, so the server 130 can perform the correlation, generate the set of command sequences, and/or generate the transaction rules for the legacy device 102.

At 208, in some embodiments, 208 the AR application 120 can determine possible shortcut sequences. For example, the AR application 120 can determine a portion of the command sequence or the subset of the keystroke sequence for the shortcut key. Based on the training set of transactions, the AR application 120 can determine several shortcut keys for use at 214. The AR application 120 can display, via the overlay 126, several portions of the command sequence or subsets of the keystroke sequence corresponding to training set of transactions. The AR application 120 can receive user input indicating whether certain portions of the command sequence (or corresponding subsets of the keystroke sequence) are accurate.

At 210, the AR application determines a command sequence based on the customer commands. The command sequence maps to a keystroke sequence for the legacy keyboard 104. In some embodiments, the AR application 120 can access a command list for the legacy device 102 based on the device type. The AR application 120 generates, based on the device type, the keystroke sequence that corresponds to the command sequence. In some embodiments, the AR application 120 and/or the server 130 use transaction rules (e.g., associated with the legacy device) when determining the command sequence.

In some embodiments, the AR application 120 can determine whether steps of the customer commands are in order acceptable by the legacy device 102. The AR application 120 can, in response to determination that the steps are not in order acceptable by the legacy device 102, re-organize order of the steps of the customer commands. The AR application 120 can determine the command sequence that corresponds to the customer commands in the re-organized order.

In some embodiments, the AR application 120 can acquire, via the AR device 114, an image of the customer that provides the customer commands for the transaction. The AR application 120 can access (locally and/or via the server 130) customer preferences for the customer, wherein the customer preferences modify at least one of the customer commands. The AR application 120 can determine the command sequence further based on the customer preferences.

At 212, the AR application determines whether to generate a shortcut key. The AR application 120 can determine to generate the shortcut key based, for example, on complexity of the transaction. If the transaction is determined to be complex (e.g., above a certain complexity level threshold), then the AR application 120 can determine to generate the shortcut key. The complexity level threshold can be adjusted based on determination of a competency level of the operator, e.g., the lower the operator competency, the lower the complexity level threshold. The determination of whether to generate the shortcut key can be based on whether the AR device 114 can communicate over a communication link (such as the legacy communication link 124) with the legacy device 102.

At 212, the AR application 120 can also determine what type of the shortcut key to generate. The AR application 120 can generate the shortcut key as a virtual key, i.e., that a key indicator visible via the AR display 122 but which does not map to a physical key on the legacy keyboard 104. The AR application 120 can also map the shortcut key to a key on the legacy keyboard 104, e.g., via a key indicator on the overlay 126. The shortcut key type determination can be made based on whether the legacy keyboard 104 and the legacy device 102 can support use of a physical key without directly affecting the transaction (i.e., the selection of the particular physical key would not affect the transaction until communication is received by the legacy device 102 via the legacy communication link 124). If the AR application determines that to generate the shortcut key, flow continues at 214. Otherwise, flow continues at 216.

At 214, the AR application generates the shortcut key. The shortcut key can map to at least a portion of the command sequence (that maps to a subset of the keystroke sequence). Upon detection of the user selection of the shortcut key (i.e., from the AR display 122), the AR application 120 can communicate the at least a portion of the command sequence (or the subset of the keystroke sequence) associated with the shortcut key to the legacy device 102, such as via the legacy communication link 124. The AR application 120 can use, for the shortcut key, the portion of the command sequence or the subset of the keystroke sequence as determined at 208.

At 216, the AR application 120 generates the overlay indicating the keystroke sequence mapping to the command sequence. If the shortcut key is generated at 214, the overlay 126 can also include the key indicator for the shortcut key. The AR application 120 can determine the operator of the AR device 114. The AR application 120 can access operator preferences for the operator, where the operator preferences can indicate how to modify at least one element of the overlay. The operator preferences can indicate to modify how a certain key indicator is displayed and/or how long each key indicator is displayed after the operator selects the certain key indicator. For example, the operator preferences can indicate that the first key indicator is colored green, and the second key indicator is colored red.

At 218, the AR application 120 displays, via the AR device, the overlay over the keyboard of the legacy device. The AR application 120 can display the overlay 126 to substantially line up with the legacy keyboard 104, in the operator's user view, via the AR display 122. The overlay 126 substantially lines up when the key indicators 118 and 119 visually overlap, in the user view, the physical keys 110 and 112 of the legacy keyboard 104, respectively. The key indicators 118 and 119 can be displayed in the keystroke sequence order, so the transaction is accurately prompted, to the operator, for selection via the legacy keyboard 104.

At 220, the AR application monitors entered keystrokes and generates new overlays based on errors. For example, once the AR application 120 detects a user selection of the physical key 110, the AR application can cease displaying the key indicator 118 over the physical key 110, and instead display the key indicator 119 over the physical key 112. If the key indicator 119 (and thus the physical key 112) is not selected by the user, and another physical key is instead selected, then the AR application 120 can determine that an error occurred.

The AR application 120 can determine a sequence of user keystrokes that are entered by the operator. The AR application 120 can compare the sequence of user keystrokes to the keystroke sequence. The AR application 120 can determine, based on the sequence comparison, an error in the sequence of user keystrokes. The AR application 120 can determine, based on the error and the keystroke sequence, a new keystroke sequence. The AR application 120 can then generate a new overlay indicating the new keystroke sequence.

Figure 3:
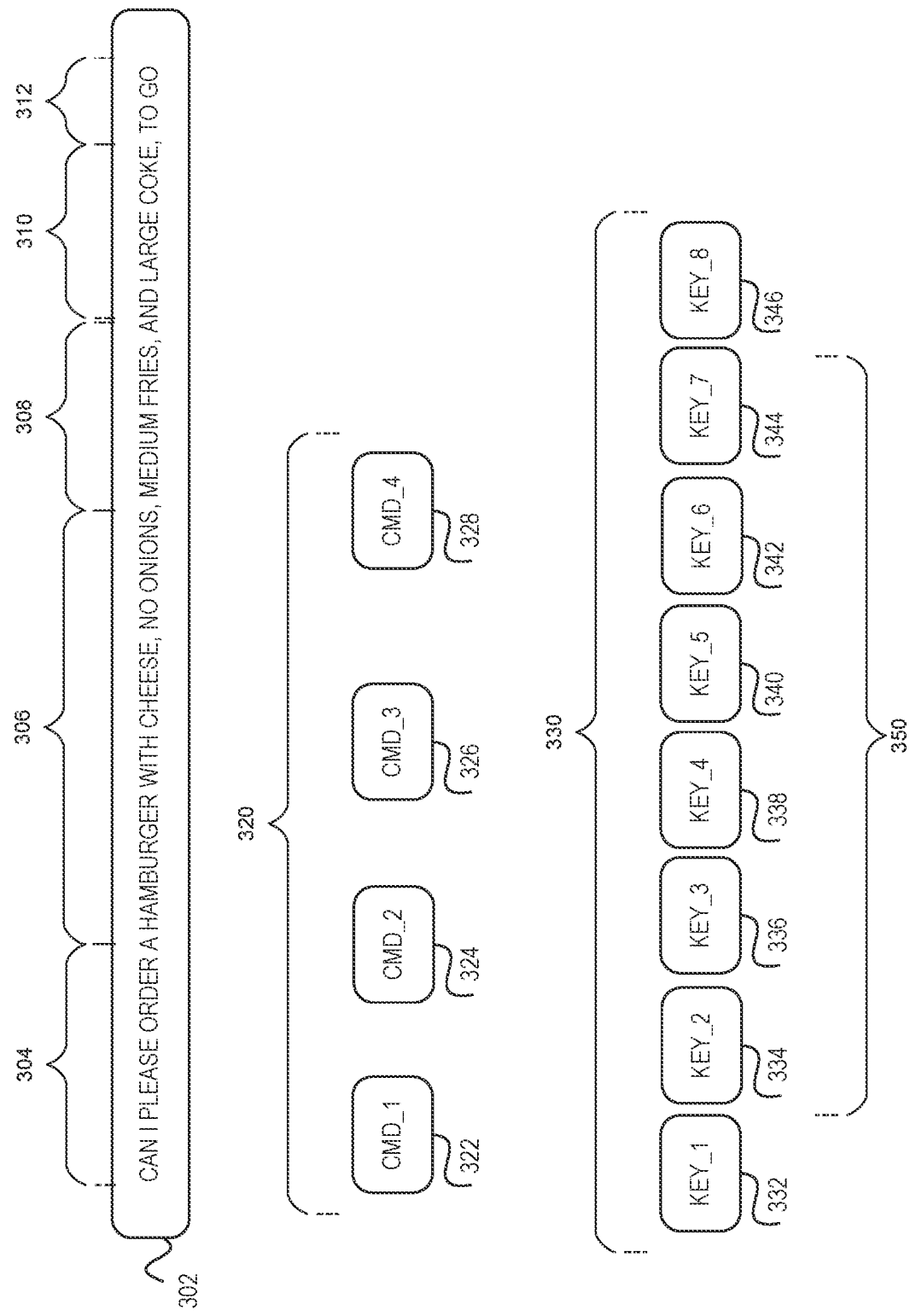
FIG. 3 illustrates examples of customer commands, and example corresponding command sequence and keystroke sequence, as used by the AR application.

FIG. 3 illustrates examples of customer commands, and example corresponding command sequence and keystroke sequence, as used by the AR application of FIGS. 1 and/or 2. Element 302 illustrates an example of voice data (corresponding to audio data) that can be accessed by the AR application 120. The AR application 120 can (locally and/or by communicating with the server 130) perform voice analysis on the voice data 302 to determine customer commands 304-312. The AR application 120 can (locally and/or by communicating with the server 130) determine a command sequence 320 based on the on the customer commands 304-312. The AR application 120 can (locally and/or by communicating with the server 130) determine a keystroke sequence 330 based on the on the command sequence 320. The AR application 120 can (locally and/or by communicating with the server 130) determine a shortcut keystroke subset 350 of the keystroke sequence 330. The shortcut keystroke subset 350 can be used for generation of the shortcut key.

The AR application 120 can analyze the customer commands 304-312 and determine that the customer command 304 indicates customer intent, but is not translatable into an element of the command sequence 320. Based on the customer command analysis, the AR application 120 can determine that the customer commands 306-310 translate into respective elements 322-326 of the command sequence 320 associated with a portion of the transaction (e.g., the actual order for the customer). Based on the customer command analysis, the AR application 120 can determine that the customer command 312 translates into element 328 of the command sequence 320 that indicates a type of the transaction (e.g., that the transaction is a to-go order).

The AR application 120 can then analyze the elements 322-328 of the command sequence 320 and determine the keystroke sequence 330. This keystroke sequence determination can be based on the transaction rules and type of the legacy device, as each legacy device can have a different keystroke sequence and/or a different legacy keyboard. The transaction rules can be different for different merchant locations even if the same legacy device is used. For example, the legacy device at a merchant A may have a different set of transaction rules from the same legacy device at a merchant B. Based on the command sequence analysis, the AR application 120 can determine that element 322 of the command sequence 320 maps to keystrokes 334-336. Similarly, the AR application 120 can determine that elements 324, 326, and 328 of the command sequence 320 maps to keystrokes 338-340, 342, and 344, respectively. The AR application can determine, based on the legacy device type and/or the transaction rules, that keystrokes 332 and 346 are necessary to initiate and terminate entering of the transaction, respectively.

The AR application 120 can also generate a shortcut key based on a at least a portion of the command sequence 320. The AR application 120 can determine the shortcut command subset 350 that corresponds to the keystrokes 334-344 (for the command sequence 322-328), but would still require the operator to use keystrokes 332 and 346 for initiating and terminating entering of the transaction.

Figure 4B:
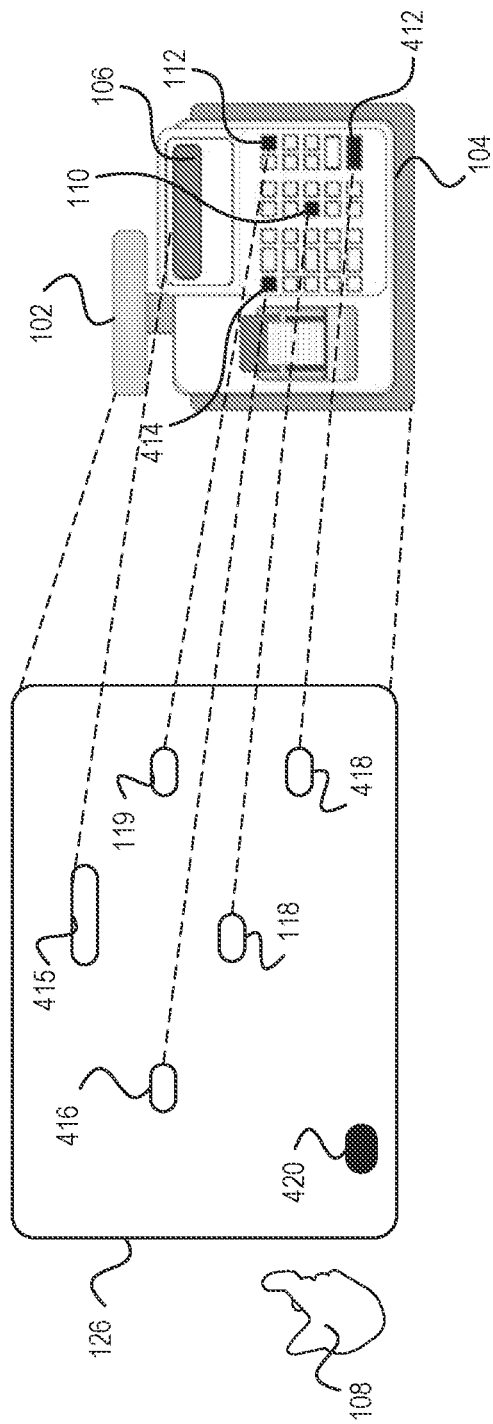
FIGS. 4A and 4B are diagrams illustrating embodiments of a display shown by an AR device to access legacy transaction terminals.
Figure 4A:
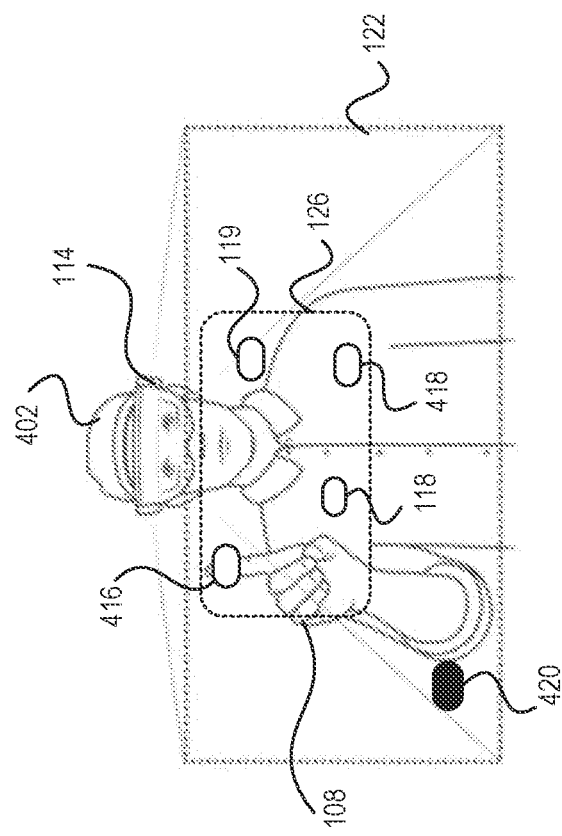

FIGS. 4A and 4B are diagrams illustrating embodiments of a display shown by an AR device for accessing legacy transaction terminals. FIG. 4A illustrates the AR display 122 as seen by the operator 402 via the AR device 114. The user can see a user view 306 via the AR display 122. The user can see the overlay 126, displayed via the AR display 122, that overlaps with the legacy keyboard 104. The overlay 126 can include key indicators 118, 119, 416, and 418. Each of the key indicators 118, 119, 416, and 418 can map to a separate physical key on the legacy keyboard 104. The AR application 120 can display one key indicator at a time for the key indicators 118, 119, 416, and 418, in order as indicated by the keystroke sequence 330.

The AR display 122 can also display a shortcut key 420. The AR application 120 can associate user selection of the shortcut key with the commands of the shortcut command subset 350. In FIG. 4A, the AR application 120 displays the shortcut key 420 outside of the overlay 126, and thus the shortcut key is not mapped to any keys of the legacy keyboard 104.

FIG. 4B illustrates how the overlay 126 is displayed with relation to the legacy keyboard 104. The overlay 126 can include key indicators 118, 119, 416, and 418, that map to physical keys 110, 112, 412, and 414, respectively. The AR application 120 can display, via the overlay 126, the key indicators in the order indicated by the keystroke sequence 330, i.e., in the keystroke sequence order. For example, the AR application 120 can only display the first key indicator 118 of the keystroke sequence 330, while the remaining key indicators 119, 416, 418, and 420 are not made visible on the overlay 126. Once the AR application 120 detects the user selection of the physical key 110 that is mapped to by the key indicator 119, the AR application 120 can display the second key indicator 119 of the keystroke sequence 330, while not displaying the first key indicator 118 or the remaining key indicators 416 and 418. The AR application 120 can display each key indicator by only displaying the next key indicator as indicated by the keystroke sequence order, by visually highlighting the next key indicator, and/or by visually dimming the remaining (i.e., not the next key indicator), among other techniques.

In some embodiments, the AR application 120 can also display a virtual display 415 with one or more elements. The virtual display 415 can map to the legacy display 106, or can map to another area of the AR display 122. The virtual display 415 can display additional information about the transaction and/or the customer. The virtual display 415 can display portions of the customer commands 304-312, the command sequence 320, and/or the current and/or the next keystroke of the keystroke sequence 330. The virtual display 415 can display prompts for the operator to clarify any ambiguous customer commands.

The AR application 120 can detect the user selection 108, which can indicate a selection, by the user 402, of one of the physical keys 110, 112, 412, and 414. The AR device 114 can detect the user selection 108 of the physical key via a variety of methods, including by tracking user's 402 gestures, detecting hand motion of the user 402, and/or receiving signals from a pointing device held by the user 402. The AR application 120 can determine whether the detected keypress is for the same physical key as indicated by the overlay 126 (i.e., for a next step of the keystroke sequence). If the AR application 120 determines that the user selection 108 is for a different physical key, the AR application 120 may determine that an error occurred, and can determine a new keystroke sequence and/or a new overlay to complete the transaction.

The shortcut key 420 can be displayed inside of the overlay 126, and can be mapped to another physical key of the legacy keyboard 104. The AR application 120 can map the shortcut key 420 to the command subset 350 that maps to the keystrokes 334-344 (for the command sequence 322-328). For example, the keystroke 332 can be mapped to the physical key 110 (which is indicated by the key indicator 118). If the AR application 120 does not use the shortcut key, the AR application 120 can select the next key indicator to display from the keystroke sequence order. If the AR application 120 uses the shortcut key 420, the AR application 120 can display the shortcut key 420 once the AR application 120 detects the user selection of the physical key 110 as mapped by the key indicator 119. Upon detection of the user selection of the shortcut key 420, the AR application 120 can communicate the portion of the command sequence (and/or the corresponding keystrokes) over the legacy communication link to the legacy device 102. The AR application 120 then can display the next key indicator 418 (as indicated by the keystroke sequence order).

Figure 5:
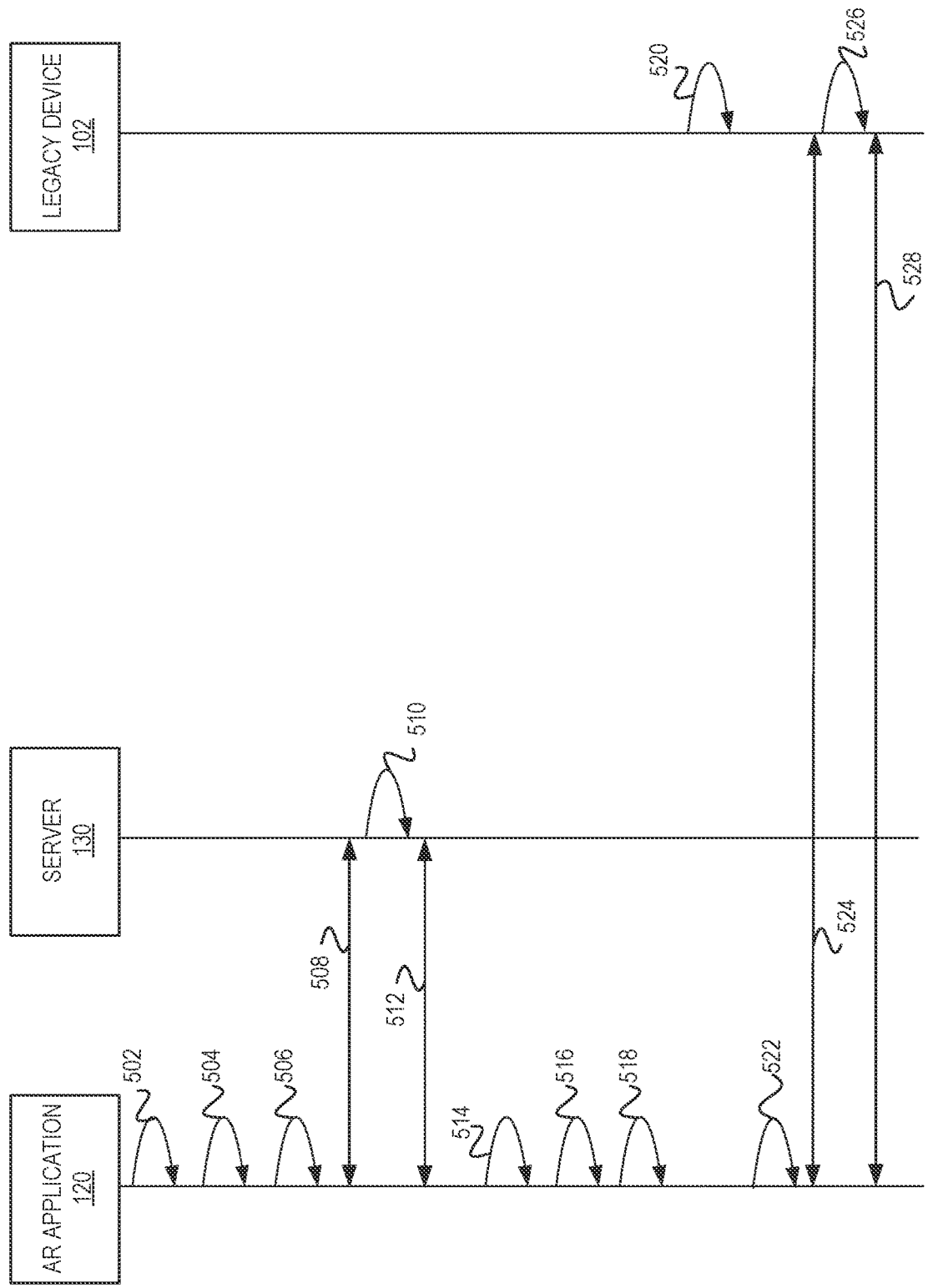
FIG. 5 is a timing diagram illustrating operations for using AR to access legacy transaction terminals, according to some embodiments.

FIG. 5 is a timing diagram illustrating operations for using AR for secure transactions, according to some embodiments. As shown by FIG. 5, the AR application 120 communicates with the server 130. The AR application 120 can also communicate with the legacy device 102. The communications of FIG. 5 can be performed over one or more communication networks. Portions of the timing diagram of FIG. 5 correspond to the flow diagram of FIG. 2.

At 502, the AR application 120 acquires, via the AR device, an image of a keyboard of the legacy device. At 504, the AR application 120 accesses customer commands for initiating a transaction using the legacy device. At 506, the AR application 120 can determine whether the training mode is being used. At 508, if the AR application 120 determines that the training mode is not being used, the AR application 120 can communicate with the server 130, where the communication can include the customer commands and/or the image. At 510, the server 130 can determine the command sequence based on the customer commands, the image, and/or associated transaction rules. At 510, the server 130 can determine a type of the legacy device based on the image. At 512, the server 130 can communicate the command sequence and/or the type of the legacy device, including a layout of the legacy keyboard, to the AR application 120.

At 514, the AR application 120 can determine the command sequence based on the communication received from the server 130. At 516, the AR application 120 can determine whether to generate a shortcut key, and generate the shortcut key accordingly. At 518, the AR application 120 generates the overlay and displays the overlay over the legacy keyboard. At 520, the legacy device 102 can receive a user selection for a physical key. At 522, the AR application 120 can determine whether the physical key selected by the operator matches the currently displayed key indicator of the keystroke sequence order. At 524, if the AR application 120 determines that the user selects the shortcut key, the AR application 120 can communicate the subset of the command sequence to the legacy device. At 526, the legacy device 102 can implement the subset of the command sequence. At 528, the legacy device 102 can communicate (e.g., via the legacy communication link) result of the subset of the command sequence to the AR application 120.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 1-5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
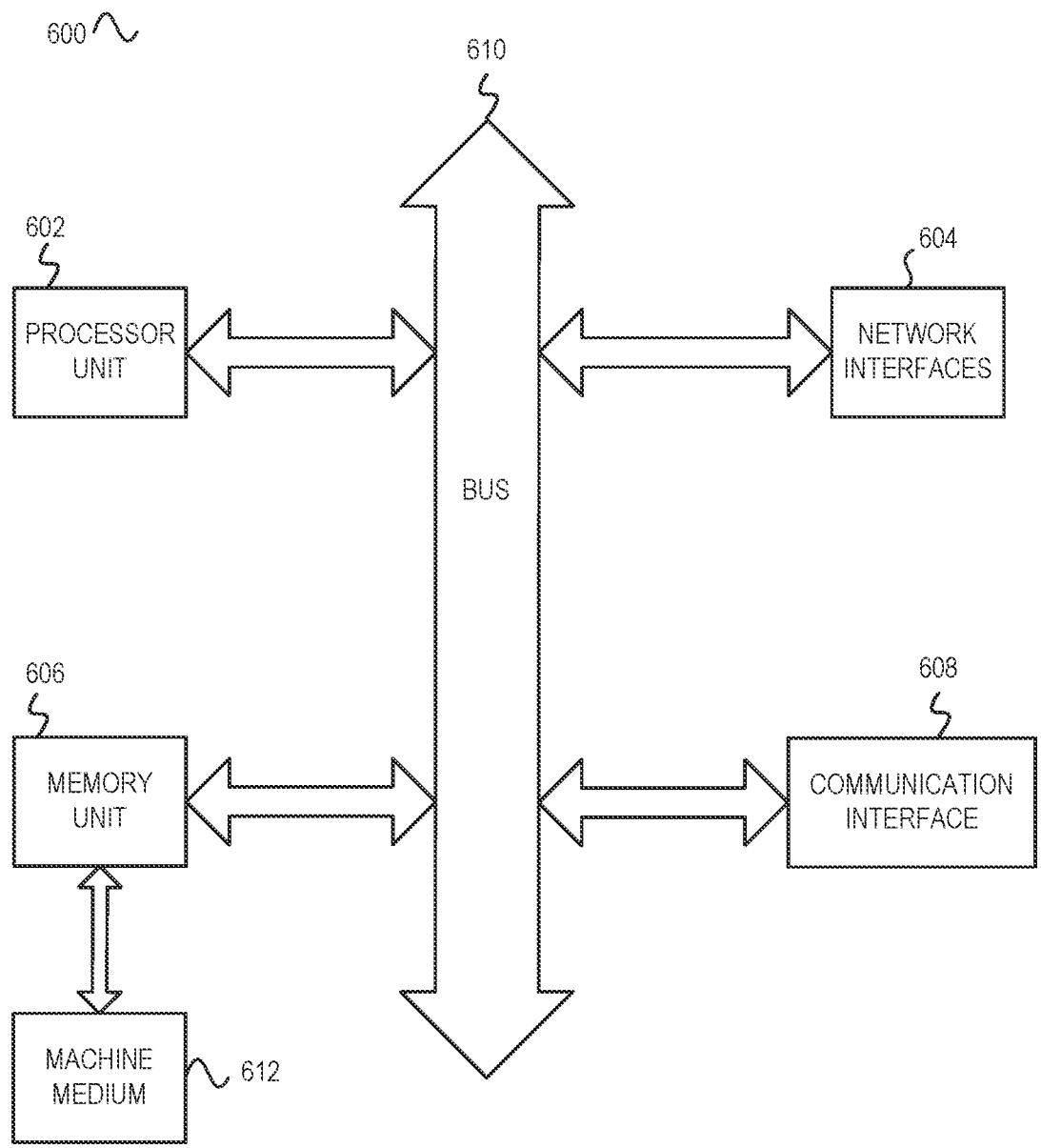
FIG. 6 is a block diagram of embodiments of devices discussed with reference to FIGS. 1-5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that implements using an AR device for accessing legacy transaction terminals. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using an AR device for accessing legacy transaction terminals as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for facilitating access to transaction devices via augmented reality devices, the method comprising:
   determining, based on accessing at least one customer command, a user intent to initiate a transaction using a transaction device;
   determining a command sequence based, at least in part, on the at least one customer command, the command sequence for input using an input device of the transaction device to initiate the transaction;
   determining to generate an overlay that maps virtual input elements displayed by an augmented reality (AR) device to input elements of the input device;
   generating the overlay for displaying the virtual input elements, using the AR device, corresponding to the command sequence over the input device; and
   displaying, via the AR device, the overlay by visually projecting the overlay over the input device of the transaction device to visually indicate, using the virtual input elements, respective elements of the command sequence on corresponding input elements of the input device.

2. The method of claim 1, wherein said determining the command sequence comprises:
   accessing, via the AR device, an image of the input device of the transaction device;
   determining a command list for the transaction device based, at least in part, on an image analysis of the transaction device to determine a device type; and
   generating, based on the device type and on the at least one customer command, the command sequence.

3. The method of claim 1, wherein said generating the overlay comprises:
   determining, based on a device type of the transaction device, a layout of the input device of the transaction device, wherein the generating the overlay is based on the layout of the input device such that elements of the command sequence are to visually indicate a next step of the command sequence based on a detected user activation of an element of the input device that corresponds to a current step of the command sequence.

4. The method of claim 1, wherein said determining the command sequence comprises:
   determining whether steps of the at least one customer command are in order that is acceptable by the transaction device; and
   in response to determination that the steps are not in order acceptable by the transaction device, re-organizing the steps of the at least one customer command, wherein the command sequence corresponds to the at least one customer command in a re-organized order.

5. The method of claim 1, further comprising:
   acquiring, via the AR device, a set of images corresponding to a training set of keystrokes for the transaction using the transaction device;

correlating the training set of keystrokes to the at least one customer command to generate a set of command sequences; and using the set of command sequences and the transaction, generating a set of transaction rules for the transaction device, wherein said determining the command sequence is determined using the set of transaction rules.

6. The method of claim 1, further comprising:

acquiring, via the AR device, a sequence of user keystrokes performed by a user of the AR device;

comparing the sequence of user keystrokes to the command sequence;

determining, based on the sequence comparison, an error in the sequence of user keystrokes; and indicating to the user, visually via the AR device, the error in the sequence.

7. The method of claim 1, further comprising:

acquiring, via the AR device, an image of a customer that provides the at least one customer command for the transaction; and accessing customer preferences for the customer, wherein the customer preferences modify at least one of the at least one customer command, wherein said determining the command sequence is further based on the customer preferences.

8. The method of claim 1, further comprising:

determining an operator of the AR device; and accessing operator preferences for the operator, wherein the operator preferences modify at least one element of the overlay;

wherein said generating the overlay comprises modifying at the at least one element of the overlay based on the operator preferences.

9. The method of claim 1, further comprising:

generating a shortcut sequence corresponding to a certain command sequence, wherein said generating the overlay comprises generating a shortcut key, wherein said displaying the overlay comprises further displaying the shortcut key on or in vicinity of the input device; and responsive to a detection of a user selection of the shortcut key, communicating certain instructions corresponding to the certain command sequence to the transaction device via a communication link, the certain instructions for causing the transaction device to perform the certain command sequence.

10. A system comprising:

a non-transitory memory storing instructions; and a processor configured to execute the instructions to cause the system to:

determine, based on a communication indicating at least one customer command, a user intent to initiate a transaction using a transaction device, the communication received from an augmented reality (AR) device;

determine a command sequence based, at least in part, on the at least one customer command, the command sequence for input using an input device of the transaction device to initiate the transaction;

generate an overlay that maps to the input device, the overlay for displaying, by the AR device, elements of the command sequence over the input device; and communicate, to the AR device, the overlay for displaying by the AR device by visually projecting the overlay over the input device of the transaction device to visually indicate each of the elements of the command sequence on a corresponding element of the input device.

11. The system of claim 10, wherein said determining the command sequence comprises:

receiving, from the AR device, an image of the input device of the transaction device;

determining a command list for the transaction device based, at least in part, on an image analysis of the transaction device to determine a device type;

generating, based on the device type and on the at least one customer command, the command sequence; and communicating the command sequence to the AR device.

12. The system of claim 10, wherein said generating the overlay comprises:

determining, based on a device type of the transaction device, a layout of the input device of the transaction device, wherein the generating the overlay is based on the layout of the input device such that elements of the command sequence are to visually indicate a next step of the command sequence based on a detected user activation of an element of the input device that corresponds to a current step of the command sequence.

13. The system of claim 10, wherein executing the instructions further causes the system to:

receive, from the AR device, a sequence of user keystrokes performed by a user of the AR device;

compare the sequence of user keystrokes to the command sequence;

determine, based on the sequence comparison, an error in the sequence of user keystrokes; and provide, to the AR device, the error in the sequence.

14. The system of claim 10, wherein executing the instructions further causes the system to:

receive, from the AR device, an image of a customer that provides the at least one customer command for the transaction; and access customer preferences for the customer, wherein the customer preferences modify at least one of the at least one customer command, wherein said determining the command sequence is further based on the customer preferences.

15. The system of claim 10, wherein executing the instructions further causes the system to:

determine an operator of the AR device; and access operator preferences for the operator, wherein the operator preferences modify at least one element of the overlay;

wherein said generating the overlay comprises modifying at the at least one element of the overlay based on the operator preferences.

16. A non-transitory machine-readable medium having instructions stored thereon, the instructions executable to cause performance of operations comprising:

determining, based on recognizing at least one customer command of a user of an augmented reality (AR) device, a user intent to initiate a transaction using a transaction device;

determining a command sequence based, at least in part, on the at least one customer command, the command sequence for input using an input device of the transaction device to initiate the transaction;

generating an overlay that maps to the input device, the overlay for displaying, using the AR device, elements of the command sequence over the input device; and visually projecting, via the AR device, the overlay over the input device of the transaction device to visually indicate each of the elements of the command sequence on a corresponding element of the input device.

17. The non-transitory machine-readable medium of claim 16, wherein said determining the command sequence comprises:
accessing, via the AR device, an image of the input device of the transaction device;
determining a command list for the transaction device based, at least in part, on an image analysis of the transaction device to determine a device type of the transaction device; and
generating, based on the device type and on the at least one customer command, the command sequence.

18. The non-transitory machine-readable medium of claim 16, wherein said generating the overlay comprises:
determining, based on a device type of the transaction device, a layout of the input device of the transaction device, wherein the generating the overlay is based on the layout of the input device such that elements of the command sequence are to visually indicate a next step of the command sequence based on a detected user activation of an element of the input device that corresponds to a current step of the command sequence.

19. The non-transitory machine-readable medium of claim 16, wherein the operations further comprise:
acquiring, via the AR device, a set of images corresponding to a training set of keystrokes for the transaction using the transaction device;
correlating the training set of keystrokes to the at least one customer command to generate a set of command sequences; and
using the set of command sequences and the transaction, generating a set of transaction rules for the transaction device, wherein said determining the command sequence is determined using the set of transaction rules.

20. The non-transitory machine-readable medium of claim 16, wherein the operations further comprise:
determining an operator of the AR device; and
accessing operator preferences for the operator, wherein the operator preferences modify at least one element of the overlay;
wherein said generating the overlay comprises modifying the at least one element of the overlay based on the operator preferences.

* * * * *